United States Patent

[11] 3,549,026

| [72] | Inventor | Maurice Klee |
| | | Davenport, Iowa |
| [21] | Appl. No. | 814,548 |
| [22] | Filed | Apr. 9, 1969 |
| [45] | Patented | Dec. 22, 1970 |
| [73] | Assignee | J. I. Case Company |
| | | a corporation of Wisconsin |

[54] BIN LOADING DEVICE FOR COMBINES
13 Claims, 4 Drawing Figs.

[52] U.S. Cl. .................................................. 214/17,
214/83.32, 214/519
[51] Int. Cl. .................................................. B60p 1/42,
A01d 90/00
[50] Field of Search .................................................. 214/17,
17.6, 17.64, 83.32, 519—522

[56] References Cited
UNITED STATES PATENTS
| 565,068 | 8/1896 | Dornfeld | 214/17(.64) |
| 3,406,847 | 10/1968 | Sackett | 214/17 |

FOREIGN PATENTS
| 774,840 | 5/1957 | Great Britain | 214/17 |

Primary Examiner—Robert G. Sheridan
Attorney—Dressler, Goldsmith, Clement & Gordon ABSTRACT: A loading and distributing device for a grain tank of a harvesting machine and which includes a first conveyor extending between spaced sidewalls of the grain tank with a plurality of second conveyors extending from said first conveyor and each having a plurality of spaced adjustable openings to evenly distribute grain received by the first conveyor within the grain tank.

PATENTED DEC 22 1970
3,549,026
SHEET 1 OF 2
Fig. 1.
Fig. 2.
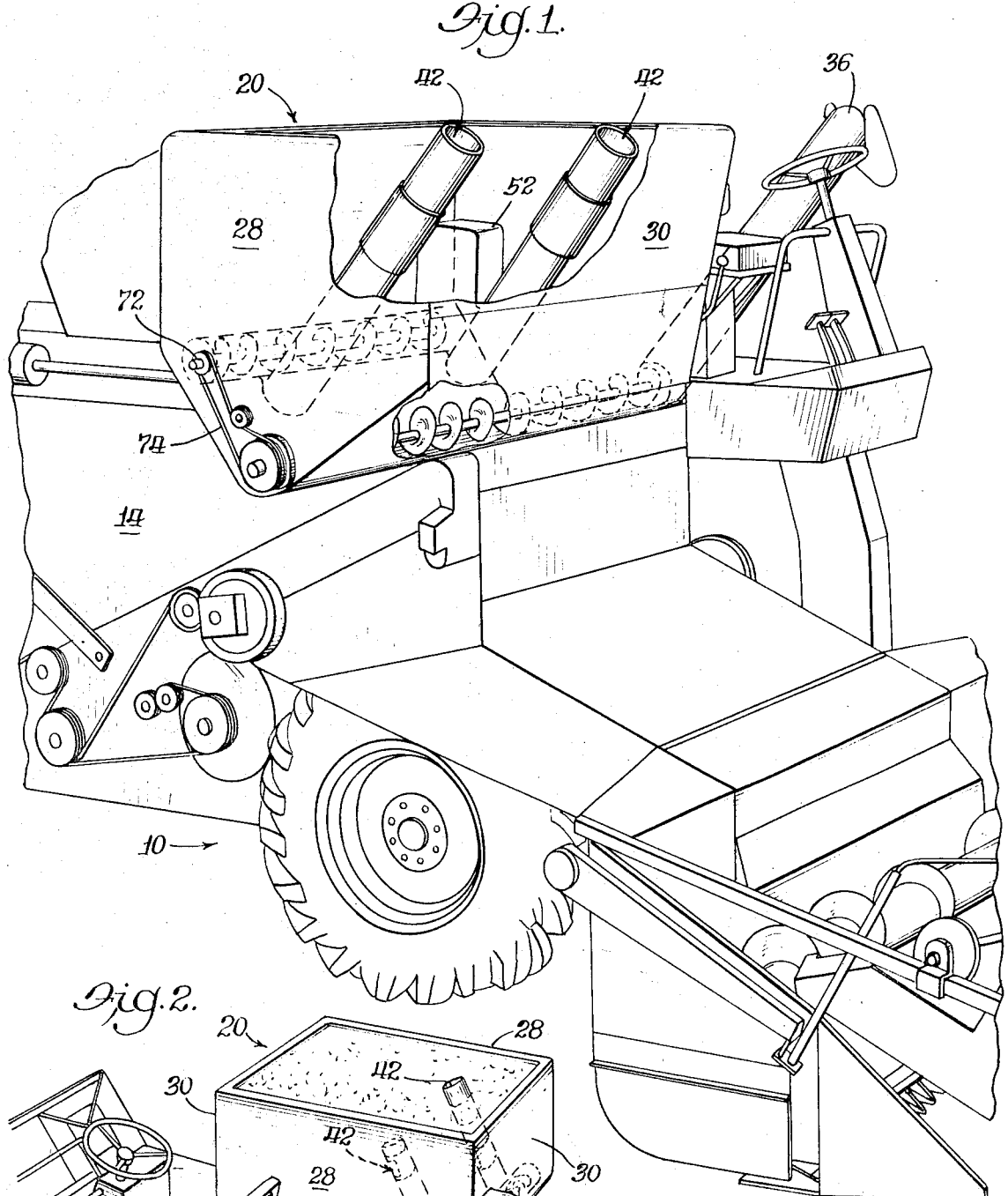
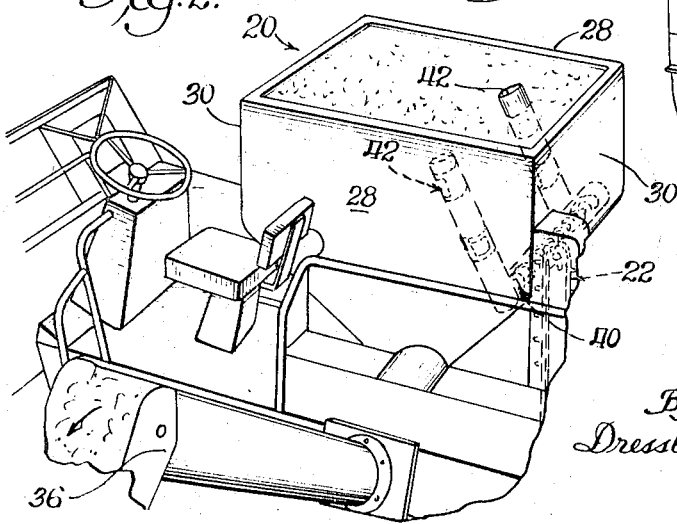
Inventor:
Maurice Klee
By
Dressler, Goldsmith, Clement & Gordon
Attys.

PATENTED DEC 22 1970

Inventor
Maurice Klee
By:
Dressler, Goldsmith, Clement & Gordon
Attys.

BIN LOADING DEVICE FOR COMBINES

With the recent industry emphasis upon greater operating capacity of the harvesting machine, it has become necessary to increase the size of the grain tank or receptacle which temporarily stores the harvested grain for subsequent transport to a larger storage member. While many recent proposals for increasing the grain-carrying capacity of a harvesting machine have incorporated duel or in some instances three grain tanks, such a method of increasing the capacity has considerable problems relating to the proper distribution of the harvested grain to the various different tanks from a single source of harvested grain.

While the single grain tank of increased capacity overcomes the above mentioned objections relating to the plural grain tanks, several problems have been encountered which to date have not found a satisfactory solution. Thus, in single grain tanks for combines, it still remains substantially conventional to provide a single rotating auger for appropriately distributing the grain received by the grain tank. An example of such a device is disclosed in Peterson U.S. Pat. No. 3,405,804.

Such a single distribution auger has several inherent problems such as: (1) the necessity for the distribution auger to run idle until the level of the material reaches the height of the auger within the grain bin; (2) the increased size of present day grain tanks makes the single distribution auger ineffective to properly distribute the grain evenly within the tank; (3) the angle of the grain bin with respect to the horizontal cannot be compensated for in the single distribution auger; and (4) the common expedient of allowing the height of the grain tank to be extended renders the single distribution auger ineffective.

SUMMARY OF THE INVENTION

The present invention overcomes all of the objections of the distribution mechanism heretofore conventional in single grain tanks of combines by providing a versatile grain tank loading and distributing mechanism which includes first conveying means for receiving grain from the separating mechanism and a plurality of distributing conveying means communicating with the first conveying means which have adjustable discharge openings that can selectively control the flow of grain through the respective openings to properly distribute all of the harvested grain evenly in virtually any size grain tank.

Thus, the primary object of the present invention is to provide an improved harvesting machine grain tank loading system that is capable of compensating for any desired variation in operation of the harvesting machine.

Another object is to provide an improved grain tank loading and distributing mechanism which is capable of substantially evenly distributing harvested grain into any size of grain tank.

Other objects of the present invention will become apparent when considering the following description taken in conjunction with the accompanying drawings.

BRIEF DESCRIPTION OF DRAWINGS

FIG. 1 of the drawings discloses a conventional harvesting machine having the present invention incorporated therein;

FIG. 2 is a perspective view of the grain tank with the present invention incorporated therein;

DETAILED DESCRIPTION

Figure 3:
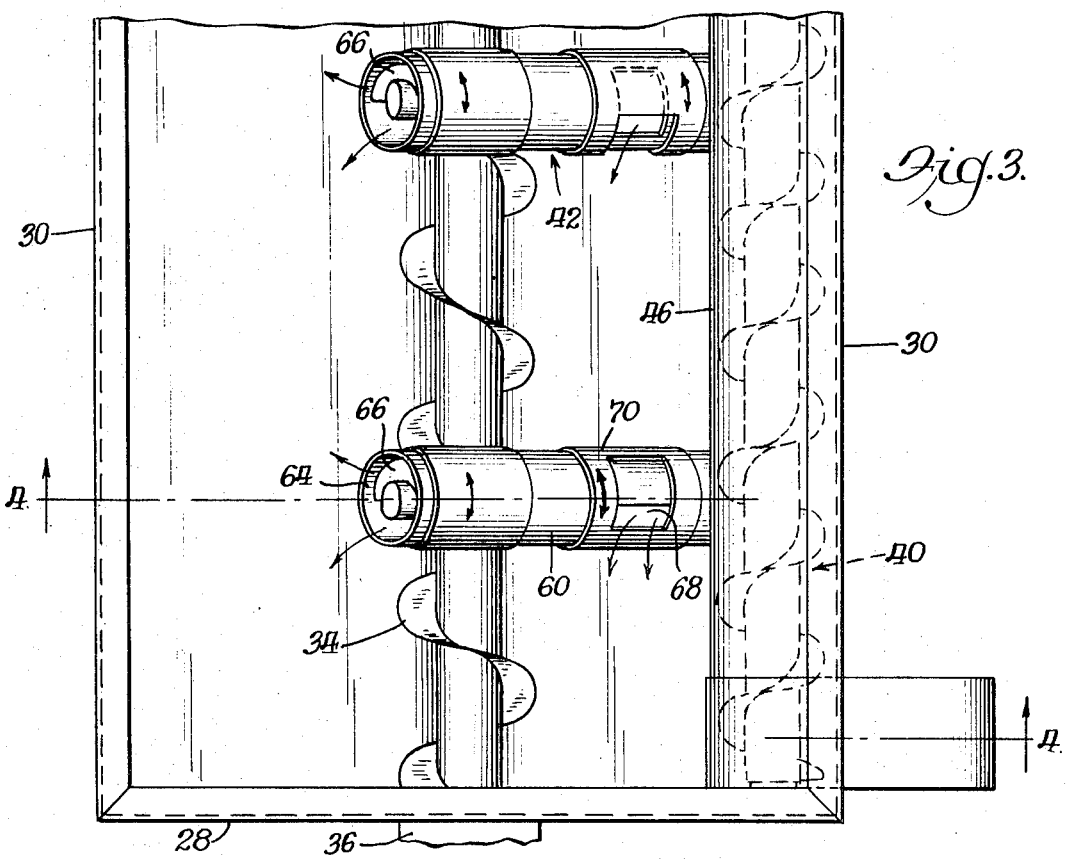
FIG. 3 is a plan view of the grain tank disclosed in FIGS. 1 and 2.

FIG. 1 of the drawings discloses a conventional harvesting machine or combine 10 having a header 12 for cutting standing crops and transferring the harvested crops through a threshing and separating mechanism 14 which separates the grain from the remainder of the harvested material. Since all of these mechanisms are conventional, a detailed description thereof does not appear to be necessary.

The harvested grain separated from the remainder of the crop is conveyed to a receptacle or grain tank 20 by elevator mechanism or conveying means 22 which elevates the grain from the collection point at the lower level of the separating mechanism 14 into the grain tank 20. In the illustrated embodiment (FIG. 4) the elevator mechanism includes a conveyor 24 disposed in a housing 26.

The grain tank or crop receptacle 20 includes spaced first side walls 28 and second spaced side walls or end walls 30 interconnected by a bottom wall 32 which includes downwardly sloping portions interconnected at their lower ends to define a trough for a horizontally extending unloading auger 34. As is conventional in harvesting mechanisms, the unloading auger 34 communicates with an inclined second unloading auger 36 which deposits the grain from the storage tank into a separate transport or storage means.

According to the present invention, means are provided for receiving the grain from the elevator or conveyor means 22 and accurately distributing the grain evenly over the entire cross-sectional area of the grain tank or bin 20. The above means includes a first conveyor means 40 extending substantially between the spaced walls 28 of the grain tank 20 and second conveying means or elongated passage means 42 communicating with and extending from the first conveying means for depositing the grain into the tank or receptacle 20.

In the illustrated embodiment, the mechanism includes means for feeding grain to the tank which incorporates the first conveying means. The first conveying means comprises a tubular passage or conduit 46 which extends between the respective side walls 28 and is in open communication with the elevator 22 through an opening 48 formed in the wall 30 of the grain tank 20 and opening 50 in the conduit. The openings 48 and 50 are sealed or isolated from the remainder of the interior of the grain tank by a cover plate 52 so that all of the grain conveyed by the elevator 22 is deposited into the tubular passage or conduit 46. The elongated conduit extends between the walls 28 adjacent the lower portion and has a conveyor or auger 56 disposed therein.

The second conveying means 42 forming the remainder of the loading and distributing mechanism likewise each include a conduit or passage means 60 having one end in open communication with the tubular passage 46 through a further opening 62 and the opposite free open end 64 disposed within the grain tank 20 and substantially in the inlet alignment with the upper end of the tank. Each conduit or tubular passage 60 has a conveyor or auger 66 rotatable therein so as to transfer the grain from the inlet opening 62 along the entire length of the conduit 60. Each conduit further includes a plurality of discharge openings 68, the discharge sizes of which are adjustable through covers 70 which are illustratively shown as sleeves having openings therein and which are retained on the conduit or tube by conventional means (not shown).

The respective augers or conveyors 56 and 66 are driven by any suitable means such as pulleys 72 carried on the free ends of the auger shafts and operatively connected to a conventional power mechanism forming part of the combine 10, as by suitable belts 74.

As is conventional in the construction of combines of this size, the grain tank is normally designed so as to be capable of increasing the capacity thereof by providing bin extensions extending above the free end of the sidewalls 28 and 30 to increase the effective height of the sidewalls. Such extensions 80 are shown in phantom in FIG. 4.

Figure 4:
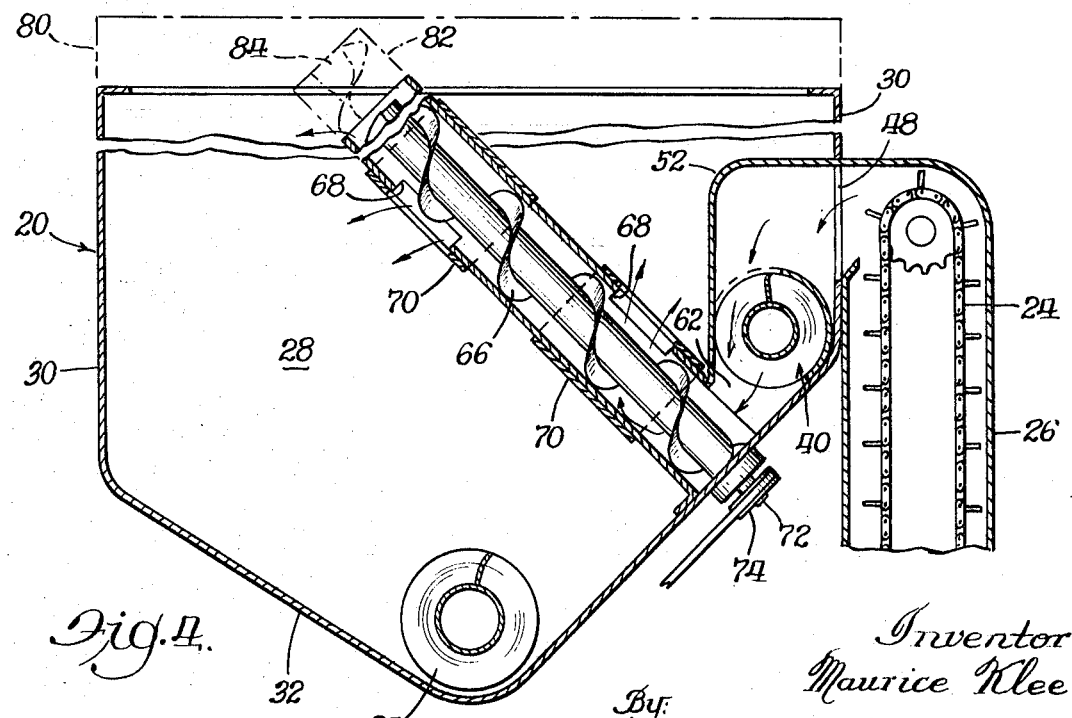
FIG. 4 is a vertical sectional view taken generally along lines 4—4 of FIG. 3.

One of the significant advantages of the present invention is that the loading and distribution mechanism disclosed herein is capable of being readily modified so as to accommodate the increased effective height of the grain tanks. Thus, as shown in FIG. 4, the modification of the loading and distribution means for accommodating the extensions 80 is readily accomplished by providing a tubular extension 82 which may, if desired, also incorporate an auger extension 84 so that the free end of the extension is disposed substantially along the upper free ends of the bin extension 80.

OPERATION

The operation of the device of the present invention is believed to be apparent from the above description but a brief description of the operation will be set forth below for the purpose of clarity. The harvested grain is conveyed by the first conveying means 22 through the openings 48 and 50 into the longitudinally extending tubular passage 46 wherein the grain is transferred substantially along the entire length of the passage by the auger 56. The grain disposed along the longitudinally extending passage 46 is then deposited into the respective passages defined by tubes 60 through the openings 62 and is subsequently transferred along the tubes or conduits 60 to be discharged through the adjustable openings or ports 68 and the free open end 64 to be evenly distributed across the entire cross-sectional area of the grain tank 20.

As can be well appreciated, the discharge from the several passages or ports along each of the several discharge conduits or tubes effect an even distribution of the grain throughout all stages of the loading of the grain tank from the cleaning and separating mechanism 14. Furthermore, if the combine is to be operated at an angle for any extended period of time, adjustment of the size of the openings 68 will allow the combine operator to provide an even distribution of the grain even when the tank is disposed angularly with respect to the ground. After a short period of operation, the operator can readily ascertain the respective size of the openings required for producing even distribution of the grain to all parts of the tank under any operating circumstances.

As can be well appreciated, the present loading and distributing mechanism for a combine grain tank overcomes all of the short comings alluded to in relation to a single auger type distributor which is disposed along the upper end of the grain tank. Thus, the present mechanism will be at all times distributing the harvested grain evenly throughout various areas of the grain tank and will overcome the objection of the single distribution auger of the type disclosed in the above patent which runs idle until the level of the material reaches the auger and thereafter becomes submerged to render the auger substantially ineffective. Also, the present distributing and loading mechanism is readily capable of being modified to accommodate the bin extensions by merely providing the appropriate extensions for the distributing conveying means or augers.

A further advantage of the present invention is that the entire mechanism is designed so as to be disposed below the upper free end of the grain tank thereby maintaining the height of the entire combine at a minimum.

I claim:

1. In a grain tank for a combine, said tank having spaced sidewalls terminating in an upper free end, the improvement of mechanism for discharging grain into said tank comprising means defining elongated passage means within said tank, said passage means having one end adjacent the lower end of said tank and an opposite end terminating below the upper free end of said sidewalls; means for feeding grain to said one end of said passage means; conveyor means transferring grain along said passage means; and discharge means along said passage means for evenly distributing grain within said tank.

2. In a grain tank for a combine, said tank including spaced walls terminating in free ends, the improvement of mechanism for discharging grain into said tank comprising a plurality of elongated tubular members, said members inclined with respect to at least one of said sidewalls and having a free end spaced between opposed sidewalls; means for feeding grain to said tubular members; conveyor means in each tubular member for transferring grain along said tubular members; and discharge means along said tubular members for evenly distributing grain within said tank.

3. In a grain tank for a combine, the improvement of mechanism for discharging grain into said tank comprising means defining a plurality of transversely spaced passages, each having an open end and an opposite end; means communicating with said opposite ends for feeding grain to said passages and including an auger conveyor extending between sidewalls of said tank adjacent the lower portion thereof; conveyor means in each of said passages for transferring grain along said passages; and discharging means along said passages for evenly distributing grain within said tank, said passages including conduits extending substantially perpendicular to the axis of said auger conveyor.

4. In a grain tank for a combine, the improvement of mechanism for discharging grain into said tank comprising means defining elongated passage means within said tank; a vertically extending elevator having upper end disposed below an upper edge of a sidewall of said tank and communicating with one end of said elongated passage means for feeding grain to said passage means; said elongated passage means being upwardly inclined with respect to said sidewall and having a free end substantially in horizontal alignment with said upper edge; conveyor means transferring grain along said passage means; and discharge means along said passage means for evenly distributing grain within said tank.

5. A grain tank as defined in claim 1, wherein said discharge means comprises means defining spaced openings along said passage means.

6. A grain tank as defined in claim 5, including the further improvement of an adjusting member adjacent each of said openings for varying the size of said opening.

7. A grain tank as defined in claim 1, wherein said elongated passage means comprises a plurality of spaced tubular members with said conveyor means comprising a conveyor in each tubular member.

8. A grain tank as defined in claim 2, wherein said conveyor means comprises an auger in each tubular member and means for rotating said auger.

9. A grain tank as defined in claim 1, including the further improvement of said means for feeding grain comprising an elongated conduit within said tank and communicating with said passage means, driven conveying means within said conduit and a conveyor for feeding grain to said conduit.

10. A grain tank as defined in claim 3, wherein said open ends of said conduits terminate adjacent to and below the upper edges of said sidewalls.

11. In a crop receptacle for agricultural harvesting machinery and including sidewalls and a bottom wall, the improvement of means for discharging grain into said receptacle comprising first conveying means disposed below an upper edge of receptacle, means for discharging grain into said first conveying means, and a plurality of distributing conveying means in said receptacle and each having one end communicating with said auger type conveying means and having an opposite end spaced from said sidewalls, said distributing conveying means each further including means defining spaced discharge openings between said ends whereby to distribute the grain between said sidewalls.

12. A crop receptacle as defined in claim 11, in which each said distributing conveying means comprises an inclined conduit having an open free end spaced above said bottom wall and below said free ends, and an auger in said conduit for conveying grain along said conduit to be discharged through said openings and said open free end.

13. A crop receptacle as defined in claim 11, including the further improvement of individually adjustable means for varying the size of said openings.

PO-1050
(5/69)

UNITED STATES PATENT OFFICE
CERTIFICATE OF CORRECTION

Patent No. 3,549,026      Dated December 22, 1970

Inventor(s) Maurice Klee

It is certified that error appears in the above-identified patent and that said Letters Patent are hereby corrected as shown below:

It is certified that error appears in the above-identified patent and that said Letters Patent are hereby corrected as shown below:

In column 1, the first two paragraphs under the head "Bin Loading Device for Combines" should be inserted.
  --The present invention relates generally to material handling apparatus and more particularly to an improved conveying mechanism for discharging grain into the grain tank of an agricultural harvesting mechansim, such as a combine.
  --A typical combine includes a header which harvests a crop and moves it rearwardly through threshing and separating mechansim wherein the grain is separated from the remainder of the harvested material. The grain is thereaft transferred to a temporary storage tank disposed on the harvesting machine and is subsequently discharged from the storage tank to larger transport or storage means.

In column 2, line 46, "in the inlet" should be replaced by --in horizontal--.

SIGNED AND
SEALED
MAR 16 1971

(SEAL)
Attest:

Edward M. Fletcher, Jr.
Attesting Officer

WILLIAM E. SCHUYLER, JR.
Commissioner of Patents